March 22, 1966     S. PASHAIAN ETAL     3,241,675
ROTARY FILTER AND METHOD Filed June 4, 1962     9 Sheets-Sheet 1

INVENTORS,
Sark Pashaian
BY Herbert R. Damerau

Curtis, Morris & Safford
ATTORNEYS

March 22, 1966 S. PASHAIAN ET AL 3,241,675
ROTARY FILTER AND METHOD
Filed June 4, 1962

INVENTORS.
Sark Pashaian
BY Herbert R. Damerau
Curtis, Morris & Safford
ATTORNEYS March 22, 1966  S. PASHAIAN ETAL  3,241,675
ROTARY FILTER AND METHOD

Filed June 4, 1962  9 Sheets-Sheet 7

Fig. 19

INVENTORS,
Sark Pashaian
BY Herbert R. Damerau

Curtis, Morris & Safford
ATTORNEYS

3,241,675
ROTARY FILTER AND METHOD
Sark Pashaian, Monroe, and Herbert R. Damerau, East Detroit, Mich., assignors to Ajem Laboratories, Inc., Livonia, Mich.
Filed June 4, 1962, Ser. No. 199,717
4 Claims. (Cl. 210—73)

This application is a continuation-in-part of our prior application Serial No. 125,597, filed March 9, 1961 and now abandoned.

This invention relates to separation of solid particles from liquids in which they are carried and to apparatus therefor.

It is common practice in many fields to pass fluids through screens or filters to remove entrained or suspended solids or to classify granular, powdered or other more or less finely divided particulate matter. In such operations the solid materials which are of size larger than the interstices in the screen are held back by the screen while the fluids, with finer suspended solids, if any, pass through the interstices.

If, however, the operation continues for any substantial time, the larger pieces, caught on the screen, block the interstices to some extent so that only finer particles can escape while finer and finer solids collect on the screen to build up a layer of residue which becomes more and more impervious. At a later stage, the finer solids and gelatinous materials fill in the spaces between the larger pieces and cover the whole filter cake to such extent that it may become almost totally impervious to the fluid, whereupon further effective operation ceases.

At this point, or before, it is customary to stop the operation and reverse the flow or to scrape off the filter cake or otherwise to restore to some extent the previous character of the filter. At best, the flow is non-uniform and the degree of filtering varies with the thickness of the cake built up, so that efficiency is impaired.

Rotating continuous filters have been known in the past wherein a screen is supported on a drum-like structure and submerged in liquid, and filtrate is drawn off from the interior of the structure so as to create a pressure differential tending to force additional liquid through the screen, while solids carried by the liquid are restrained on the surface of the screen, gradually building up a layer of residue or "filter cake" and at the same time tending to clog the interstices of the screen so that the rate of filtration progressively decreases as the thickness of the deposit layer increases. Likewise, the range of particle sizes strained out by the filter is extended downward as the layer of solids builds up on the screen. Such filters have been made more or less continuous by providing for removal of the deposit layer at one point in their rotation. This removal may be by transfer to a belt or contacting roll or by a scraper that scrapes off the deposite layer, with or without a brush and/or liquid spray or flow to wash off the screen before starting its next rotation. The screen in such case, whether wire screen or a filter cloth or felt, etc., operates by physically restraining the particles on the filter structure and passing the liquid through interstices too small to accommodate the solid particles. The speed of rotation is very low.

It has also been common practice for separation of solids from liquids to put the mixture into a rapidly rotating vessel so that the heavier solid particles are thrown against the outer wall or into a peripheral area and collected while the clarified liquid is drawn off from the center. This art of centrifuging and centrifugal separation is highly developed, but that is different from our invention. Whereas, centrifuging depends on very rapid rotation of a body of liquid to separate the heavier portions of a liquid mixture from the lighter by a centrifugally induced multiplication of the force of gravity acting upon them, our process avoids, so far as possible, rotating the whole mass of liquid mixture and instead rotates or otherwise moves the screen rapidly through the liquid with a view to separation by impact on the solid particles.

It is an object of the present invention to provide an apparatus and method for separating suspended matter from fluids, which will operate continuously with more uniformly high efficiency and with flow controlled independently of build up of residue on the filter. This may seem absurd, as it has seemed inevitable that removal of solids from a fluid stream passing through a filter must leave the removed material collected on the screen.

We have now demonstrated that this build up of removed solids can be avoided. By use of a rotating hollow separator having a pervious screen outer wall, e.g., of woven or tightly wound, knitted, looped, etc. wire or organic fiber or mono-filament, or thin ribbon, etc., immersed in the fluid to be filtered, we have shown that the suspended solids as they approach the screen are driven back dynamically by some dynamic action which is not explained by known theories of centrifugal separation.

Not only are the solids driven back from the rotating screen while the fluids pass on through the screen and are removed axially, but apparently the solids do not even reach the screen. This conclusion, unbelievable as it first appears, seems inescapable for two reasons: (1) The screen is not clogged or covered by a "cake" or layer of the filtered out solids. They remain in suspension and mainly at some distance from the screen. (2) Even after months of continuously removing from liquid suspended abrasives after use in grit blasting and deburring etc., there is almost no abrading away of the screen. It appears that the peculiar action resulting from use of the process and apparatus of this invention results in a certain amount of local recirculating or regurgitation of the filtered liquid back through the screen, and it may be that this produces hydraulic forces on the suspended solids outside of the screen which drive them back away from the screen and with enough velocity so that they can collide with other oncoming particles and drive them back also.

Our present invention uses a screen on a rotation drum structure, or other means for supporting the screen against differential pressure of the liquid being filtered, and moving the screen rapidly through the flow of liquid from inlet to outlet.

Although the separation is effected by rotation of the filter unit it cannot be explained as ordinary centrifugal separation. Centrifuges require speeds of rotation of the order of thousands of revolutions per minute for separation of particles of the order of thousandths of an inch which are separated in the present invention and even much smaller particles with speeds of a few hundred r.p.m. The ordinary speeds of centrifugal separation produce too much back pressure in the rotating screen to be satisfactory for industrial operations. In the present process, rotation of the body of liquid is advantageously minimized both before and after passing through the screen.

The device of our present invention is not in the true sense a filter, and our method of separation is not truly filtration as it does not restrain and retain particles on the surfaces of a filter medium while allowing liquid to pass through; but, on the contrary, it depends on a dynamic action. It is our belief that the most important action in this process is that the solid particles are given inertia by sudden acceleration as they approach the screen and are thereby driven away from the screen. Thus the screen is not clogged by the progressive separation of the solids and the separating action is not impaired.

The separated solids being continuously driven away from the surface of the screen gradually settle toward the bottom of the vessel in which the raw liquid being treated is contained, while the clarified liquid or "filtrate" is drawn off from the inside of the drum.

It was surprising and wholly unpredictable that the solids could be driven out of the liquid in which they were carried, without forming a concentrated layer on the screen itself and without centrifuging the entire body of the liquid. Even more surprising is the fact that the screen is, to a large extent, continually cleaned while filtering, apparently by a recirculating effect, i.e., some of the clarified liquid which had passed into the interior is pushed out again and this serves to clear out solid particles which may have become enmeshed in the screen. To the extent that such reversal of flow occurs, it tends to cut down the output of clarified liquid from the device, however, to the extent that it keeps open the passages through the filter, it also has the opposite effect of increasing the useful output.

A major difference between the older rotary filter devices and the present invention is, as indicated above, in the dynamic action of the present device; and this results from the speed of travel of the surface of the screen in the body of liquid such that, when it strikes the particles of solid material they are hurled a substantial distance through the liquid by the impact. Speeds of the order of hundreds of feet per minute (miles per hour) are used for our invention. We have found that the higher the speed, so long as the liquid is not driven away entirely, the better. At first, however, it appeared that the higher speeds of the rotary screen merely stopped the separation by stopping the flow by an opposed centrifugal effect tending to throw back from the screen the liquid as well as solid. This we have overcome by increased pressure differential to drive the liquid through the screen; but such increased differential made problems of sealing the moving parts so that the unfiltered liquid would not leak in through bearings and joints.

We have now found that, by use of devices for controlling the flow of the liquid after it has passed through the screen to the interior, we are able to overcome these difficulties and greatly increase the capacity and efficiency of the moving screen device embodying our invention. This stoppage of flow appeared to be due to centrifugal action when the liquid is held against the rotary drum long enough for it to acquire rapid rotory motion. As indicated above the reverse flow is desirable to a limited extent, but it must be limited. A study of the action of our devices indicates that the liquid on first flowing inwardly through the passages in the screen is moving mainly radially, but it also has more or less tangential or circumferential component imparted to it by the rotating screen. If it remains at or near the screen, its radial component is soon dissipated, while its circumferential component is rapidly increased. We have, therefore, discovered that the most efficient operation of our device and method depends upon counter-acting the circumferential component, and advantageously diverting it so that the inertial force is used to move the liquid rapidly away from the moving screen and toward the outlet; at the same time, however, keeping enough of the liquid in contact with the screen long enough so that a small amount of liquid is continually being pushed back through the screen to keep its interstices clear and in condition for effective operation.

The present invention involves the use in combination of some or all of several basic concepts to accomplish the separation of solids from fluids.

*(a) Selective centrifugal effects on suspended particles distinct from the body of suspending liquid*

This may be illustrated by picturing a solid particle carried in a liquid suspension approaching a rotating screen. There is considerable turbulence near the periphery of the rotating screen, caused in part by inertial throwing of the fluid, and in part by a "paddle effect" of roughened edges, humps on the screen wire, etc. As the particle approaches the screen, it is driven by the screen just long enough to be accelerated to a tangential velocity and inertia that will throw it away from the screen in a direction more or less tangential, the actual direction of its travel depending also upon other forces imposed.

The liquid which is struck by the transverse surfaces of the moving screen seems to respond by spreading out laterally along said surfaces so as to drive a part of the liquid through the screen, while a part of the liquid is "spattered" away from the solid particles and also thrown back from the screen. The fluid that goes through the screen will be clarified, and the solid particles are concentrated outside where they gradually settle out.

There is considerable motion of liquid through the screen no matter whether it is small mesh or large mesh. The size of the mesh is not critical. If the solid particles enter the mesh, or even before, while they are still at some distance from the screen, the centrifugal flow-back referred to above will, for the most part, act to throw off such particles.

The speed of rotation should be sufficient then to throw off the solid particles dynamically, and to "spatter" the the liquid to drive it through the screen; and the pressure differential is correlated to the velocity of the screen so that centrifugal force is over-balanced by the pressure, enough to assure that liquid is drawn through the screen, but not so much as to pull in the solid particles with the liquid or to strain them out and hold them on the screen.

Though the rotating screen may tend to swirl the liquid, the flow direction of the filtrate liquid is primarily inward and toward the outlet, urged by the differential pressure between the liquid outside the screen as compared to the outlet pressure inside.

This pressure differential may be established by a suction pump connected to the internal compartment of the screen chamber.

For a brief time while some of the liquid is enmeshed in the screen, it is subjected to variety of forces, not only the over-all pressure differential pushing the liquid inward and the inertial forces imparted to the liquid by the screen, but also the centrifugal force imparted to liquid which is engaged and carried around with the screen.

Such centrifugal force will predominate with some of the liquid which can push outward; and this will assist in dislodging and ejecting solid particles if any should cling to the mesh. We have found that the energy with which these particles are driven away from the rotating screen, will be governed by the angular velocity of the rotating unit, by the properties inclusive of viscosity of the liquid, by the diameter of the rotating screen, and by the resultant centrifugal force imparted to the solid particles themselves and/or to some of the fluid.

We have utilized surface irregularities as miniature impellers on the outside and/or on the inside of the screen chamber to accentuate local turbulence in the liquid media. The result of this turbulence at the surface of the screen is that some of the liquid flows in and out through the screen on circuitous routes.

We have found that heavier solid particles, more than lighter solids and immiscible liquid particles, are carried away from the screen by inertial forces, and that such heavier particles escaping from the screen tend to drive off or deflect away other particles. If only lighter particles are present, heavier solid particles can be added as a filter aid and can be recovered from the separated residue and reused.

(b) Use of screen barrier with controlled area of openings

While size of the mesh of the screen is not critical, the total open area does influence the effectiveness. It is recognized that the efficiency may be influenced by variation of the rotating velocity or linear peripheral speed of the screen; but if other factors such as dimensions of the screen and the peripheral speed are maintained constant, selection of wire size so as to increase or reduce the total open area, can influence the probability of particles getting through the screen barrier. With identical open area and speeds of rotation, and pressure drop, the same filtrate flow was obtained in spite of variation of mesh size.

For the finer solid particles, smaller mesh screens are preferred. This gives more openings in which the multiple flow patterns occur in the liquid media with the consequent forcing of the solid particles to a safe distance from the screen boundary. Higher speeds of rotation have an effect similar to the smaller mesh. The more frequent passage of the miniature impellers assure that even the smaller particles will be thrown off, even in spite of fluid tending to push the solid particles into the screen.

Ordinarily we prefer to have larger interstices than would be required for screening out the particles by mere flow. With larger mesh the resistance to flow of the liquid through the barrier is less. The openings can be a fraction (e.g., 0.1) of, or several times the diameter of the average particle, or as much as 100 times. An opening size in the screen is multiplied many times, the efficiency of separation will drop unless the rotational velocity is also increased enough to assure that each particle will be deflected away by turbulence or regurgitating currents.

(c) Use of controlled turbulence at and near the screen boundary

As disclosed above, the rapid movement of the screen through the fluid generates a disturbance and movement of the liquid. In the case of our rotating filter screen, local movements of liquid are encountered, the turbulent liquid tending to drive some of the solid further away from the path which it would have to follow to pass through the screen. The magnitude of the impact faces or other irregularities and the frequency with which these occur on the screen surface affects how much turbulence is experienced.

(d) Influence of screen or other filter media structure on effectiveness of removal of solids from liquid There is a significant difference whether a woven wire, or monofilament, mesh or perforate sheet screen is used, having the surface substantially in one plane or curved surface, as compared to a mat, woven or unwoven, in which the actual locations of respective interstices are at different radial distances from the rotating center. Even though these variations of radial position are of small extent, they have much influence and are cumulative on the total performance of the screen in repelling solids from the screen. Thus, for example, a single thickness of screen is better than several layers overlapped, and a simple square weave net is better than a more complicated weave, for example "Dutch" weave, or twill, which present a thicker cross-section, except for separation of very fine particles.

A surprising by-product advantage is that the solid particles thus thrown off by the rotating screen in a tangential direction constitute a dynamic "screen" through which the unfiltered fluid must pass. If the in-flow to the filter carries entrained solids they face a probability of impact with the solids which are being thrown off and thus, whereas most of the liquid will pass through, much of the suspended solids will be repelled before reaching the screen. The proportion of solids which can pass through this peripheral bombardment and reach the screen to be thrown back by action of the turbulent fluid or by impact of the screen depends, of course, on the particle size, concentration and specific gravity of solids near the surface of the screen.

The same atcions of centrifugal effects of the rotating screen and bombardment by solid particles thrown off from the screen also effect the surrounding fluids, but whereas the solid particles encountered are bounced off by elastic impact, the fluids can flow around the projectile solids and are affected rather by fluid friction or in minute amounts by being pushed ahead of the particles and of the parts of the screen. These small fractions of the fluid thus impelled will not flow freely through the filter, but other parts pass without obstruction or are forced around whatever obstructions may be encountered and pass on through the screen to its outlet.

To the extent that some of the fluid is caught up and impelled outwardly by centrifugal force, this has significant effect in washing the screen to keep the pores open, and for deflecting solid particles as mentioned above.

(e) Effectiveness of shearing action of rotating screen in preventing passage of solids through the screen or their accumulation on the screen The shear stresses between the rotating screen and the fluid around it has a significant function, to prevent solids from clinging onto the screen. As a particle starts to approach the screen, is moving forward and if contact is made the shear action of the liquid is most effective in dislodging a particle from the surface. This shearing action also affects the liquid in which the solid particle is traveling. This shearing action with a liquid-encapsulated particle results in transfer of the liquid and the particle together away from the surface, and opposes the forces which tend to capture the liquid-encapsulated particle and suck it through the screen. If an irregular particle, such as a fragment of metal, approaches the screen in the liquid media, a tip of this particle may touch the screen and the resulting force exerted on the particle in the liquid medium produces a rotation which effectively reduces the chance of its capture on the screen. These multiple phenomena from shearing action, prevent caking, build-up on the filter, and reduction of efficiency or entire stoppage of the flow through the screen.

It is obvious that this shear effect is dependent upon the peripheral speed of the screen and to some extent on other properties such as viscosity, lubricity, etc., of the liquid media.

(f) Use of remote suction on rotating filter

The sustained pressure differential from outside to within the filter screen used in our invention may be generated, at least in part, by a suction pump. The degree of this pressure gradient affects the velocity of radial flow and therefore the probability of impact with previously ejected particles and with projections on the rotating screen. The suction, the r.p.m. of screen and the related shear strength further govern the magnitude of forces that prevent the particles from entering through the screen mesh into the interior of the screen device.

(g) Use of supplemental self-contained flow-generating means rotating with the filter The desired flow through the screen can be adjusted by the inclusion of small impellers, e.g., blades in series more or less parallel to, advantageously inside of, the screen surface. These may be turbine-like blades, may be quite small, and are positioned so that in normal operation they tend to force the liquid in toward the center of the filter chamber.

(h) Use of means for obstructing circumferential travel within the rotary filter drum Unrestricted circumferential movement of the liquid within the rotary filter drum produces centrifugal effects which are inconsistent with the most efficient use of this invention. These effects can be controlled by baffles positioned in the interior of the drum but not rotating therewith. Such baffles are best formed so as to deflect the liquid inward and toward the axial outlet port.

*(i) Superimposed effect of gravity on the separation of the solid from a liquid phase*

In a chamber of sufficient size, gravity may be utilized to assist the removal of the solids. Particles which are of higher density than the fluid, such as core sand, metal particles and the like, will continually settle by gravity, thus removing the particles from the action of the feed stream. An adequate space is provided for sedimentation at a substantial depth below the rotating screen.

*(j) Compact filter unit*

One great advantage gained by the invention is its ability to operate in a reservoir of liquid carrying dirt or other suspended solids and to continuously pump out clear liquid and collect sludge at the bottom of the reservoir. In wet blasting machines and parts washers and the like it is important that this filter operate substantially continuously. We have, therefore, made a compact unit which can be mounted in the top of such a reservoir, can be swung up for convenient inspection or servicing and can be replaced with another like unit in a few minutes. By use of a diagonal junction face at the end of the filtrate duct and a corresponding junction face on the filter outlet, connection is made by insertion of the unit from, and securing it at, the top.

In the accompanying drawings we have shown, and have described herein, a specific example of the practical application of our invention and certain alternatives and modifications. These are given for purposes of illustrating and explaining the invention and its principles so that other skilled in this art will be enabled to utilize it and to modify it and apply it in various forms each as may be best suited to the requirement of a particular use.

Figure 1:
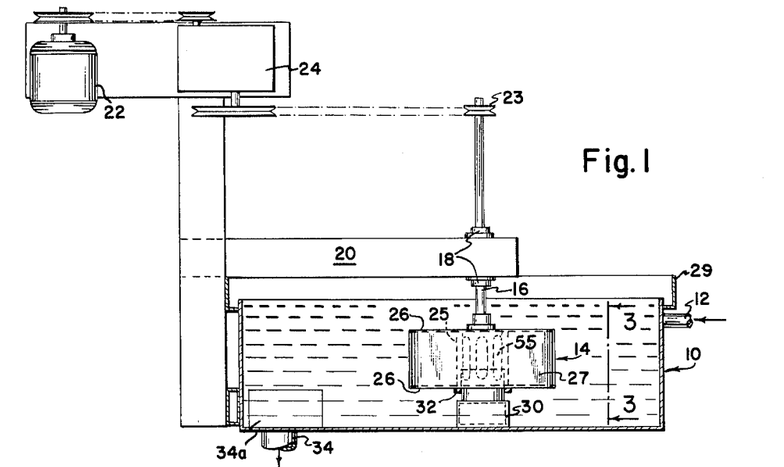
FIGURE 1 is a diagrammatic view in vertical section and elevation.

In the drawings:

FIGURE 1 shows a device embodying the invention designed for removing suspended and entrained solids from a liquid. The raw liquid carrying more or less particulate solids feeds into a reservoir 10 near its upper edge from feed pipe 12.

A filter drum 14 is submerged in the tank 10 at a considerable distance from the pipe so that the flow from the pipe is dissipated before reaching the location of the drum, and mounted on a rotatable vertical shaft 16 mounted in bearings 18 which are above the water level on a frame 20. A drive motor 22 is connected to shaft 16 through belts and pulleys, e.g., as shown at 23, and a speed control gear 24.

Drum 14, in the instance shown, is made of a center column composed of a 4″ pipe 25 longitudinally slotted, leaving flat posts 55 between the slots, and disks 26 welded to its opposite ends, and wire mesh or other pervious screen 27 secured to their periphery, e.g., by welding, brazing or continuous clamps around the edges. The screen, in the preferred example illustrated is designed for treating wash liquid after use in washing, or grit blasting, of castings and other parts, clarification of solutions from electroplating, anodizing, chemical phosphating systems, coolants from machining, grinding or honing operations, not only aqueous solutions from such operations and wash solutions, but also non-aqueous systems e.g., light oil and synthetic coolants.

This screen is a pervious sheet cylinder with its edges secured as shown and described above. A Monel metal 50 mesh woven wire screen has been found very satisfactory, or a stainless steel sheet with the "mesh" openings slit and stretched or punched or etched. Much finer screens have also been used successfully up to the finest screens available for such use (e.g. of the order of 0.01″ openings or less). Such a screen in sheet form made with precision micro openings by electro deposition is commercially available as "Lectromesh" from C. O. Jelliff Mfg. Co. to provide frequent openings of diameter of the order of .01 to .001″.

Other filter screens with interstices may be employed. This includes thin, pervious, sintered metal, spirally wound wire on longitudinal spaced supports, spaced longitudinal wires on circumferential supports, woven wire screens, thin porous ceramic, and pervious plastic, with selected size and distribution of openings. The filter drum is formed to, or closely approximating, a surface of revolution, e.g., cylindrical, truncated conical or bulbous.

The wires of the mesh may be of different diameters in the different directions and the wire count in one direction may be the same or varied from the count of the crosswise wires in the lattice, e.g., 40 in one direction to 80 in the other. For helically wound screens a cylindrical structure with appropriate spacings between adjacent turns of the wire helices can be used, with the wire coil supported on an open frame with impeller bars transverse to the direction of surface travel, whereby to accelerate solid particles away from the rotating screen. By using a plurality of wires side by side in a multiple helix one can increase the pitch so that the wires can serve as impellers to drive off the suspended particles. The wire used in such a screen may be stranded, but more advantageously is a solid wire or monofilament. It may be inorganic, e.g., metal or glass, or organic, as nylon, vinyl ester, vinylidene ester, etc., or other material capable of forming strong insoluble fibers or monofilaments.

Liquid which passes into the drum 14 is drawn as rapidly as possible to the center and is sucked out through the pipe 30 by a pump (not shown) or a syphon, etc. A suitable low friction seal, e.g., a substantially uncompressed rubber gasket 32, or a labyrinthine plate as described below, is included between the stationary pipe 30 and the rotating drum 14 to avoid sucking of untreated liquid into the filtrate pipe. Thus a pressure differential is maintained at the screen 27, so as to suck through it liquid from the tank 10.

Were it not for the rapid rotation of the drum 14 the solids carried by the liquid in tank 10 would be washed up to the screen and strained out on the screen, and this would build up a layer of solids; but in the device just described the drum is rotated at a speed sufficient to throw off, by impact, centrifugal force, and deflecting action, the solids which come into contact with the screen.

The influent comes in from the edge of the tank to the rotating screen and concentrated slurry or sludge of the solids thrown back from the screen and settling toward the bottom, is drawn off from the bottom of the tank. Solids carried by the liquid to the surface of the screen are accelerated and thrown off through the approaching influent liquid, driving back entrained solids from the approaching liquid.

In a continuous filter, the solids can be concentrated near sludge outlets 34 and a clean-out door 34a provided at a point where the sludge tends to collect. A continuous sludge conveyor may be used to clear this away.

It is in the scope of the invention to vary the shape and dimensions of the hollow filter, the orientation of its axis, i.e., horizontal or vertical or sloping, the type of screen, e.g., wire mesh or pierced sheet, etc., and the form and dimensions of the tank. It is also in the scope of the invention to vary the structure used for driving or pulling the liquid out of the filter drum.

The rotating hollow filter is attached directly or indirectly to a drive shaft which may also drive other devices, such as an impeller pump of the type disclosed in the patents of Umbricht No. 2,873,685 or 2,890,660.

Figures 2, 3, 4, 5:
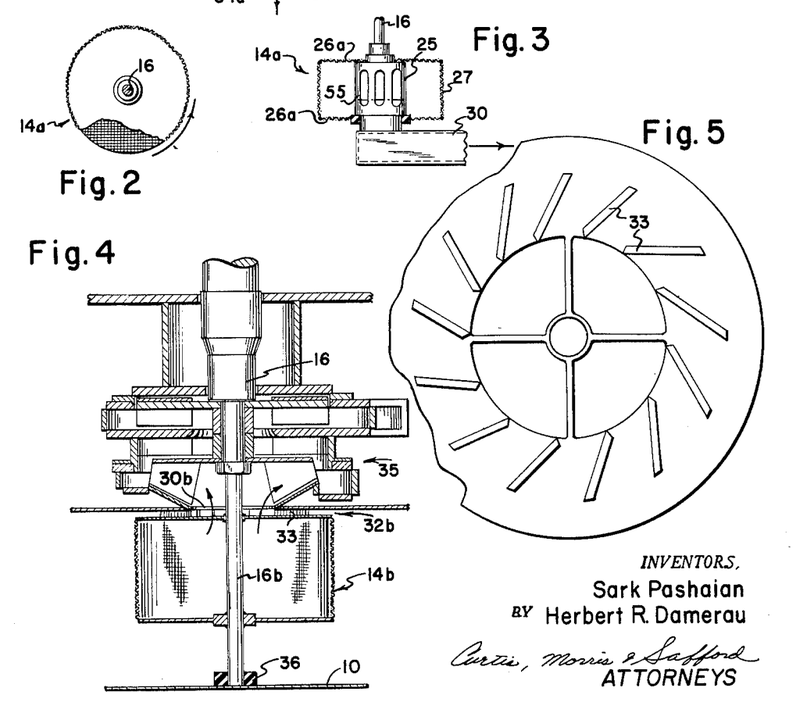
FIGURE 2 is a plan view of the top of modified filter rotor which may be used in the combination of FIGURE 1.
FIGURE 3 is a fragmentary view, partly in elevation taken from the left of FIGURE 1 on line 3—3, and partly in vertical axial section.
FIGURE 4 is an axial sectional view of a filter rotor and adjoining pump.
FIGURE 5 is a plan view of the central portion of the top of the rotor of FIGURE 4.

As shown in FIGURES 2 and 3, the filter body 14a may have screen 26a on its sides (top and/or bottom) as well as on its periphery. In such case we find it advantageous to have as small a filter chamber as is consistent with the needed area of high velocity rotating screen surface.

FIGURE 4 shows another modification in which the submerged rotating filter screen 14b is mounted on an extension of the drive shaft 16b. A pump 35, e.g. of the type shown in the U.S. Patents above cited may be mounted on the same shaft. It is in the scope of the invention to use this rotating filter on the extended pump shaft 16b without or with a bearing 36 below the filter. As shown in FIGURE 4, a water lubricated rubber bearing is indicated on a support directly below the pump and the rotating filter.

With the drum 14 rotating as fast as is desired in the practice of this invention, it is important to have it accurately centered and balanced; especially if both ends of the shaft 16 are mounted in bearings, any eccentricity or unbalance will cause rapid wear. It is an unforeseen benefit of the invention that the avoidance of deposits of residue on the screen permits perfect dynamic balancing, once established to be maintained during operation.

In other instances, instead of the pump shaft as shown in FIGURE 4, we use a hollow shaft and bearings (18d in FIGURE 9) within it at the upper and lower positions to accommodate a shaft, such as 16d, driven from a sheeve 25d or other torque transmitting device mounted on the shaft above the top of the pump shaft and supplying the torque for rotating the screen 14d. Thus, use is made of concentric drive shafts, the outer drive shaft operating the pump, 35d in FIGURE 9, while the internal shaft supports and gives the torque for rotation of the screen 14d located immediately below the inlet to the pump.

Figure 8:
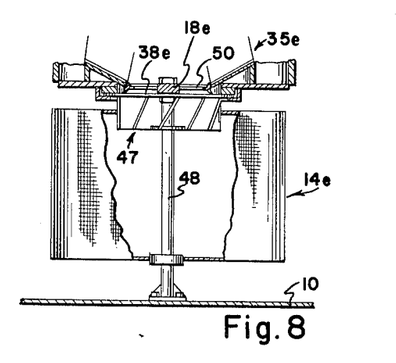
FIGURE 8 is a view partly in elevation and partly broken away to expose its axial supporting part and mounting, of another embodiment of the invention.

Such concentric shaft arrangement is also used to drive other types of filters, e.g., 14e in FIGURE 8 and the various filters illustrated in the other figures of the drawings. One advantage of this concentric shaft structure is to give optimum rotation to the screen while permitting the pump to operate at any other selected speed of rotation. This gives more versatility in the functioning of each.

Figures 9, 14, 15:
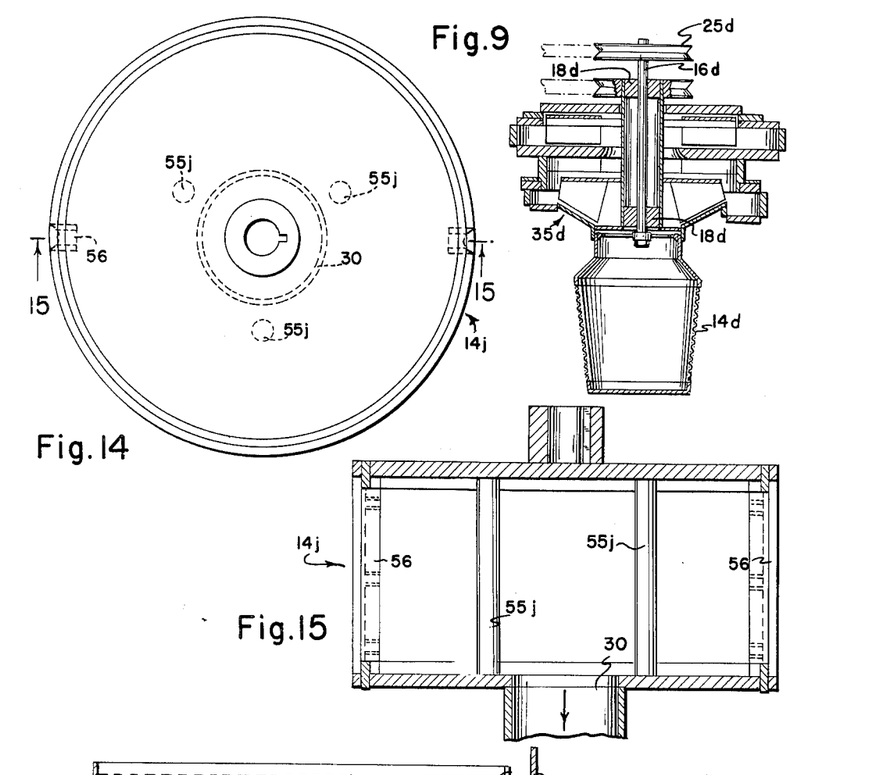
FIGURE 9 is a view similar to FIGURE 7 but showing a pump driven by a separate shaft from and telescoped with, the shaft which rotates the screen drum so that these parts can be rotated at different speeds.
FIGURE 14 is a top plan view of a screen rotor with internal reinforcing bars.
FIGURE 15 is an axial section taken on line 15—15 of FIGURE 14.

It is also in the scope of the invention to use separate motors and speed reducing devices for the outer and inner shafts, respectively, or to use the same motor driving with one speed reducer assembly the pump shaft and another gear reducer assembly, or its equivalent, to drive the internal shaft to the rotating screen (see FIGURE 9).

The ratio of diameter to length of the rotating filter 14b may be governed in respect to the size of particulate matter to be removed, the volume of liquid to be supplied to the pump, the r.p.m. of the screen and the magnitude of pressure drop across the filter media, and flow patterns within the filter. Where the drum is driven at high speed a smaller diameter drum is preferred.

The length of the screen which can be efficiently used depends upon the control of the tendency of liquid once inside the screen to rotate with the screen and develop centrifugal force tending to push it back out through the screen. This will be further discussed below.

Where the rotating filter 14 is relatively short, the bearing on the bottom side may be eliminated and the shaft 16 cantilevered from the bearings 18 above and/or in the pump.

A vane seal 32b is provided between the pump and the upper disc plate of the filter. This vane seal is designed to push a small amount of clarified liquid outward, overcoming the suction pressure of the pump by impeller action in the seal. This maintains a seal without rubbing solid-to-solid friction and therefore substantially without wear. The outward pressure of the clarified liquid prevents solid particles from entering the seal, and such clear liquid as is lost back into the raw liquid is not excessive but is well spent for this purpose.

The height of the vanes 33 in FIGURE 4 is exaggerated for clearer showing; but in actual practice they may be very low, e.g., about 1/8".

FIGURE 5 shows diagrammatically a preferred arrangement of these low vanes in a favorable position for pushing a very small amount of the liquid through between pump exterior and filter drum.

Figure 6:
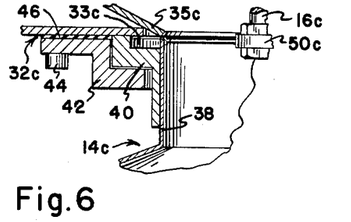
FIGURE 6 is a detail fragmentary view in axial cross section showing another form of seal.

FIGURE 6 shows in more detail a centrifugal water seal 32c using miniature impeller blades 33c on the rotating drum 14c at the bottom of a pump 35c. Again, a small amount of fresh solution that is free of solids is driven outward through the clearances in these seals, so that leakage of dirty water inward is prevented, and the seals are kept free from clogging and abrasive particles.

In the example of FIGURE 6, the pump 35c adjoins the rotating screen structure 14c, a hub 38 of which has a Z-shaped flange 40 as shown. An annular face of the flange 40 fits the underside of the body of pump 35c with a narrow clearance, and its inner face is secured tightly on hub 38. Although the flange 40 is shown with right angles, we have also used satisfactorily an obtuse angle design, advantageously an obtuse angle between the outer peripheral portion and the intermediate flange, with the intermediate flange normal to the axis as in FIGURE 6. (See FIGURE 7.)

Another Z ring 42 fits over and around the outer portion of flange 40 with narrow clearance, just enough to assure free rotation of the filter, but small enough to minimize leakage of clarified water under the low pressure differential created by the vanes 33c. The ring 42 is bolted to the pump body by bolts 44 and is sealed by a gasket 46.

Figure 7:
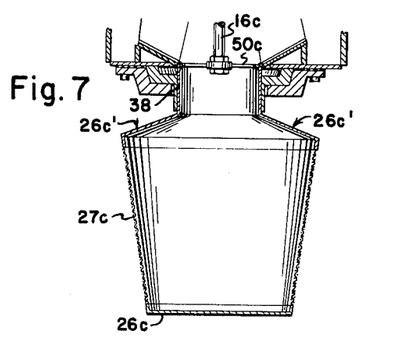
FIGURE 7 is another diagrammatic axial section of a truncated conical filter rotor.

FIGURES 6–8 illustrate the feasibility of making the filter body itself an integral extension of the impeller in the pump. Here, as in FIGURE 6, one of the end discs, 26c, has an extended hub 38; but in this case it is extended into the pump housing where it is secured to the impeller. The seal between the hub 38 and the pump housing may be the same as shown on a larger scale in FIGURE 6.

FIGURE 7 also shows another variation in its truncated conical screen for the submerged rotating filter. The object of this is to gain surface area, and to facilitate the solids settling by gravity when thrown back from any part of the screen surface. The limit of reduction in the peripheral length of the screen at the bottom of the conical area will be governed by the minimum linear speed at which the screen will repel the solids from entering its openings. Where the rotational speed is high, the diameter of the filter member may be relatively low, and where impact surfaces (transverse wires in a woven mesh) are more frequent, as when the openings are relatively smaller, the peripheral velocity (and therefore the limiting diameter of the revolving screen) may be lower. To this end the screen 27c may have larger openings at its largest end, and graduated to smaller openings at its lower end.

With the rotating filter thus assembled to the end of a pump, the same power source can drive the pump and the filter.

It is not always permissible to operate the pump at the same speed as the filter if best performance is to be attained in both. In FIGURE 8, therefore, I have shown an example in which the screen is driven hydraulically at a lower speed by reaction to the flow induced by the pump.

In this case, as in FIGURES 4–7, the filter assembly is mounted beneath the pump with its liquid outlet open to the pump inlet. The filter drum 14e is rotated by a turbine, shown diagrammatically at 47, that gives rotation to the assembly when liquid is drawn from the filter by the pump. The rotating filter 14e may be mounted on bearings near the top of the filter body as in FIGURE 1, or on a pedestal 48 rigidly mounted on the bottom of tank 10, coaxial with the pump impeller. A bearing 18e is shown mounted on a spider 50, which permits liquid to go through to the pump.

Instead of the fixed pedestal 48, the pump shaft may extend down to a bearing on tank 10, and the bearings provided at each end of the rotating filter 14e to allow rotation of the filter relative to the pump impeller.

This use of the flow of clarified effluent liquid induced by the pump 35 has a disadvantage that any clogging of the screen, by reducing the flow, will tend to reduce the speed of rotation of the screen, and that in turn may result in greater clogging. Therefore, with this arrangement one should operate well above the speed normally required. To avoid this limitation I may use a fluid torque converter drive or a true hydraulic turbine drive with liquid flow supplied by a separate pump provided for this purpose.

Thus, the rotation speed of the drum 14e may be governed in the desired range independently from the output of the pump 35.

The juncture between exit port from hte rotating filter and the inlet to pump 35 may be effectively sealed by a labyrinth seal system as discussed above or by a vane seal; or one may use the lantern ring seal as heretofore used on certain pumps. Advantageously, a lubricant or other clean fluid such as fresh water, is driven at low speed under pressure through ring chambers that may be adjacent to the resilient seal packing. The flow of fluid around the seal keeps out abrasive and keeps the packing material in effective condition.

Figure 10:
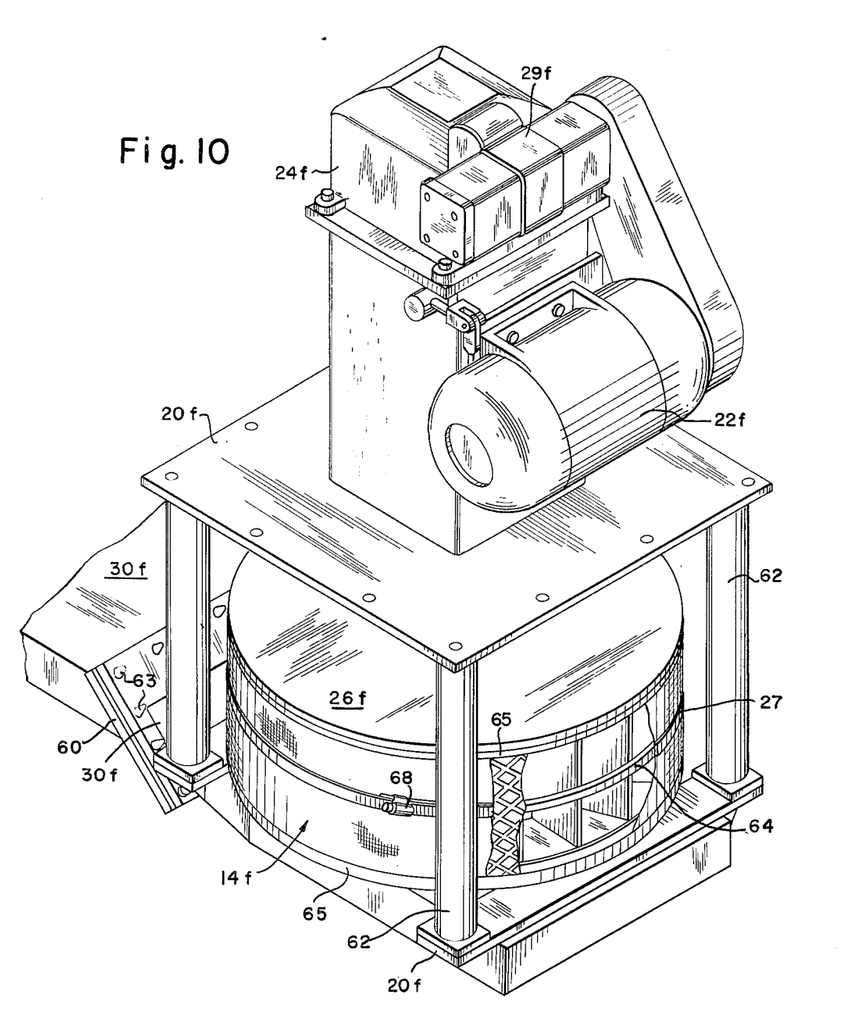
FIGURE 10 is a perspective view, partly broken away, of a separator unit adapted for quick insertion and removal into and from a reservoir with coupling to a filtrate exit pipe.
Figure 20:
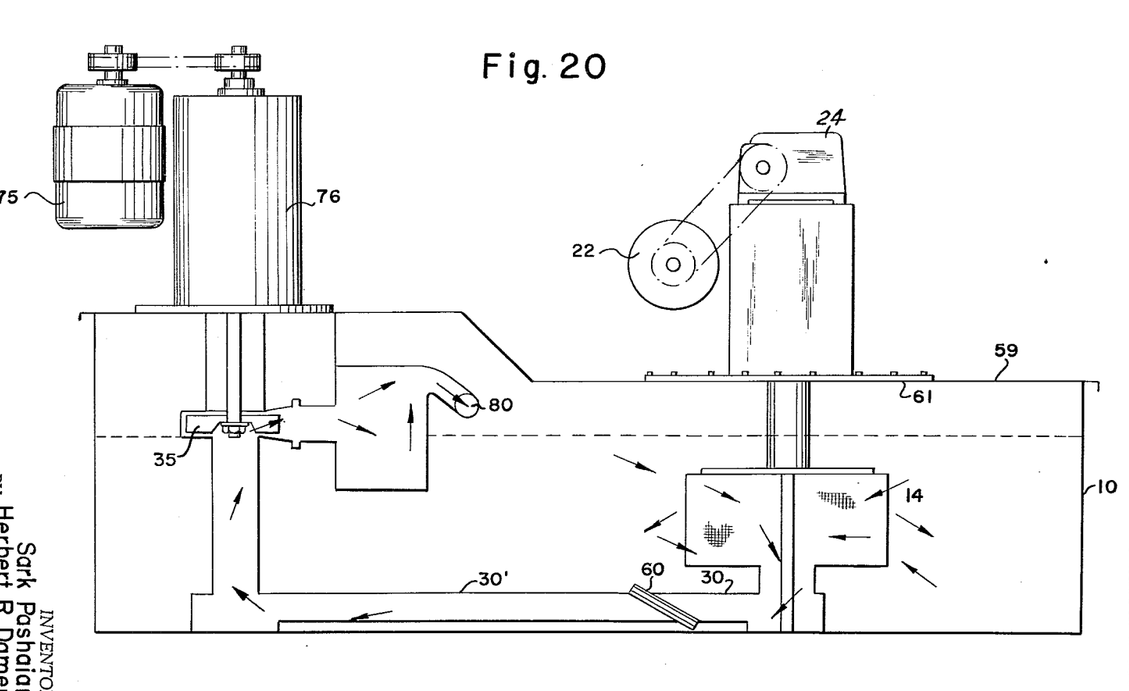
FIGURE 20 is a diagrammatic view in longitudinal vertical section of an installation embodying the separator of our invention in conjunction with a machine such as a power washer or deburring unit giving off a flow of liquid carrying suspended solids.

FIGURE 10 shows a compact unit embodying the invention and adapted to be mounted by its top plate 20f on the cover plate of a reservoir (cf. FIGURE 11), and immersed in the dirty liquid so as to clarify the liquid as it is pumped out for use. One application of such unit to a power washer is shown in FIGURE 20. As shown, the unit is fitted to the suction outlet pipe 30f, which has a sloped coupling mouth 60 facing upward, so that when the unit is lowered into position through the hole 61, it presses against the complementary sloping mouth on the outlet pipe 30f' and makes a tight seal therewith. Tapered dowel pins 63 on flange 60 and corresponding holes in the flange on the outlet mouth 30f assure good alignment.

The top plate 20f and the posts 62 constitute parts of a rigid frame for the unit, in which the screen device 14f is rotatably mounted. Top plate 20f is adapted to be bolted to the top (cf. 20g' in FIGURE 11) of a tank in which it operates. With this structure the entire coupling is done from the top and exterior of the tank.

A drive motor 22f and a speed reducer 24f mounted on the upper plate 20f' are connected to the shaft (not shown) of the rotary screen 14f. The suction pump is not shown in this figure, but is connected to the rotary screen 14f by the suction pipe 30f (cf. FIGURE 20).

The filter drum 14f is shown with the screen 27 supported on the periphery of its end plates 26f and intermediate ring or rings 64. Clamping bands 65 clamp the screen against these end plates and intermediate supports. One is shown here by way of illustration.

These clamping bands are advantageously of the type having a worm screw 68 rotatably mounted on one end and the other end held tightly overlapped and slidable thereover, except for engagement of the flights of the screw in spaced slots parallel to and engaging said flights on one side, so that rotation of the screw pulls the overlapping end of band 65 with mechanical advantage depending on the pitch of the screw. This type of structure is now in common use, especially for hose clamps.

Figure 11:
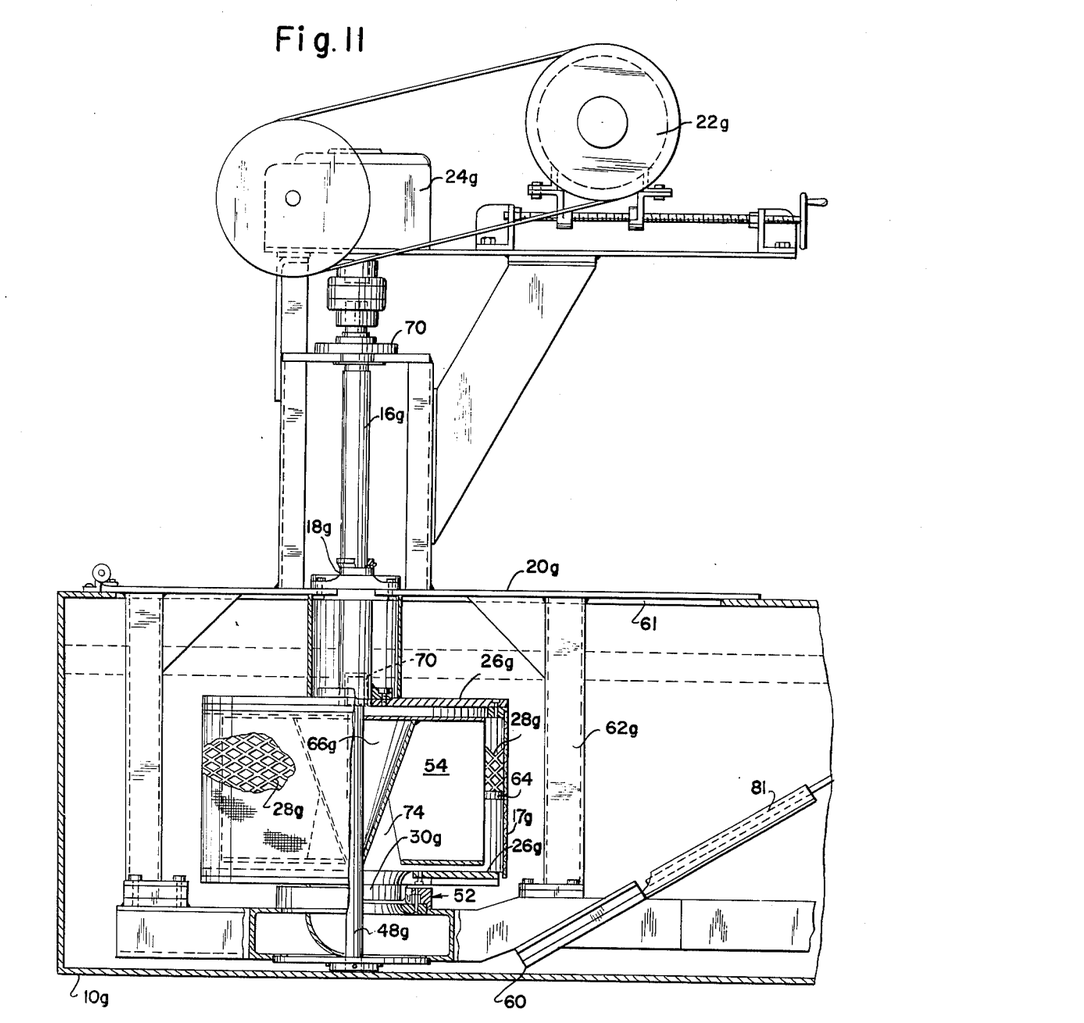
FIGURE 11 is a vertical sectional view of another form of rotor fitted with stationary flow control vanes in its interior.

FIGURE 11 shows a similar rotating unit (but with a longer drive shaft 16g) mounted in a suitable tank 10g, and also shows detail of an improved form stationary internal baffle 54g.

Figure 18:
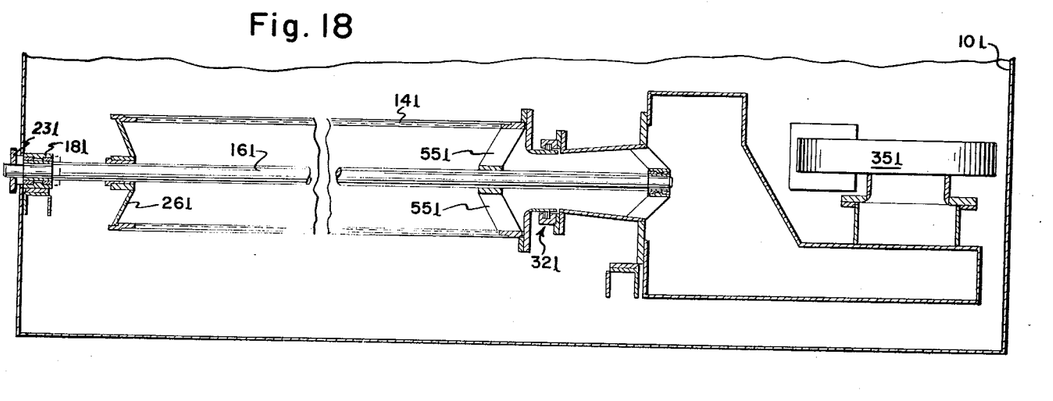
FIGURE 18 is a view similar to FIGURE 16 of a modified device.

The support rings 64, in the type of rotor shown, are spaced about 8″ to 18″ apart depending upon the rigidity of the under structure, both being designed so that by cooperation with the screen, the screen is prevented from collapsing under the pressure imposed by suction. These may be merely rings, if sufficiently strong, or may be internally suppported by spider structure attaching them to hubs (cf. 55k and 55l on FIGS. 16 and 18).

The screen may be a flexible sheet formed to a cylinder, fitting tightly over such rings or advantageously on an intermediate open work support of expanded metal, etc., 28g, referred to above. The ends of the screen may be substantially overlapped and secured, e.g., by brazing, or held by clamping rings, such as 65; or screen segments may be pre-formed with rigid frames (e.g., 120° or 180°) and assembled and secured in place in the rotor drum 14. The seal 32g in this instance is below the screen rotor and is of a conventional type, e.g., as sold by Garlock Packing Co.

As explained above, the impact faces running along the path of a screen surface, serve to kick the particles of soil out farther into the space around the screen and leave a band of semi-clarified liquid adjacent to the screen. With woven wire screen the sides of the longitudinal wires serve this function; and, likewise, the edges of a pierced sheet metal screen around the screen openings; but, there are a variety of arrangements of edges or protrusions on the periphery of the filters that will accomplish various degrees of displacement of the solids outward and assist in the liquid flow through the screen.

The form and dimensions of such edges or protrusions are among the variables which can be adjusted to give desired displacement of selected particles outward while maintaining a screen clarity and volume of flow. Others of such variables are peripheral speed, size of mesh, structure of screen, size and distribution of particles, pressure differential, and velocity of incoming liquid.

Figure 12:
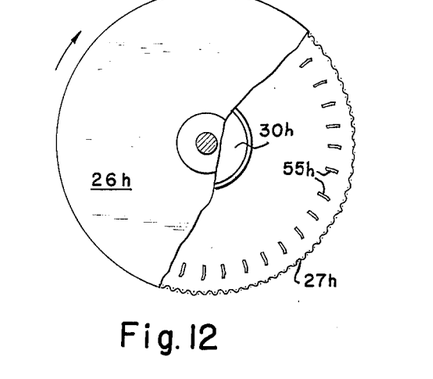
FIGURE 12 shows a filter rotor in end view, with a portion broken away to show the screen and internal impellers.
Figure 13:
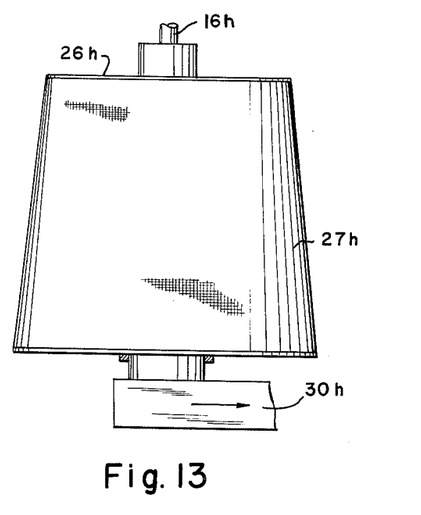
FIGURE 13 is a fragmentary elevation taken from line 3—3 of FIGURE 1 showing a filtering drum having a different truncated conical form.

In FIGURES 12 and 13, we have shown a truncated conical rotating filter drum with the broader end down. Instead of having the truncated cone 14d as shown in FIGURES 7 and 9, with its large end up so that particles thrown off drop down from the rotor, it may be inverted as shown in FIGS. 12–13, and, provided that the vanes 55 slope sufficiently backward (e.g. 15° or more to an axial plane) from top to bottom, they will accelerate the fluid toward the exit 30.

When the bars are of non-hydrofoil section they create a turbulence at the surface of the screen which may help to keep the surface clear. They can also assist in washing the screen when the direction of rotation is reversed, by driving liquid back out through the screen.

Baffles 54 and/or 55 can be used inside of the screen, as shown in FIGURES 10–11, 13–15, and 19–21, to impel the liquid inward toward the exit 30 and/or to break up circumferential flow. This increases the effectiveness of suction pressure at the screen 27.

Our initial experience with rotating screens showed that sometimes much less than the expected volume of flow was realized, especially as the rotor was made much longer. From further study of this phenomenon, it appeared that the liquid, which at first entered the screen rotor more or less radially from the external body of liquid, when once inside, was impelled to rotate with the screen until it developed a centrifugal force sufficient to drive it back out. We have indicated above that a small and local recycling of liquid in this manner seems to explain some of the advantage of our process; but, if such centrifugal action comes to affect the massive body of liquid, it throttles the flow and interferes with the intended separation.

We have found that it is advantageous to remove most of the liquid from the influence of the rotating screen promptly after it passes through it, and to obstruct circumferential motion which it may have acquired in passing through the screen. Thus a relatively low pressure differential can be effective for inducing flow into and through the rotor. To this end, internal baffles 54 and/or 55, interfere with any tendency to laminar flow in the liquid, create local turbulence and help to get the incoming liquid away from the screen and near the axis where it is drawn off to the outlet. If these baffles are designed as flow directing blades, they can serve this function more efficiently, e.g., they can, by utilizing the intertia of the incoming liquid, act like the blades of a propeller or turbine pump to divert and drive the liquid radially inward and, to the extent that the blades are sloped relative to the axis, advantageously also to give it a longitudinal component toward the suction outlet.

Figure 19:
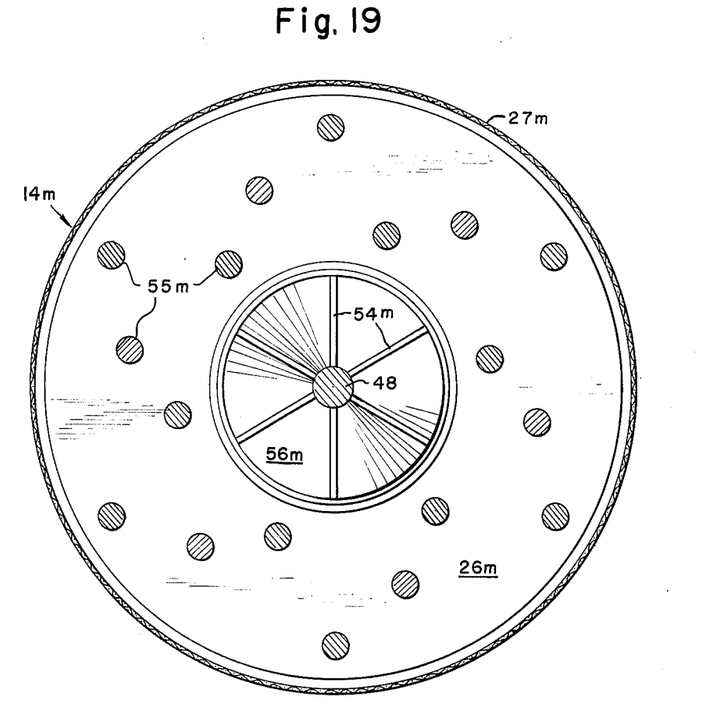
FIGURE 19 is an upward view in horizontal cross-section of a filter drum having a central flow controller surrounded by a screen drum with 18 flow control rods shown in section.

FIGURES 14, 15 and 19 illustrate the incorporation of round rods 55j extending between the end plates of the drum filter assembly. Originally three of these rods were used in the relative locations shown in FIGURE 14. Further tests show their effectiveness also at other positions of greater or less radii to the center of the rotating filter assembly 14j.

When these rods were shortened, even down to stub ends near the outlet 30, they were found to have still a significant effect in maintaining higher gallons per minute flow; and when these internal rods were removed the efficiency and gallonage of liquid that could be filtered was markedly dropped, other conditions remaining essentially the same.

It has been determined that not only rods, bars or vanes are effective in such location between the end plates, and not only full length but also even short segments, which produce a limited effect. It is in the scope of the invention to install these bars, posts or blades parallel with the rotating axis or at an angle diverging toward the axis or toward the screen. These rods, etc., may be installed in symmetrical arrangement in respect to the axis, or on irregular patterns, so as to adjust to the other dimension relations of the filter drum and to give effectiveness in gaining flow of liquid through the screen and the total assembly.

In the case illustrated in FIGURE 12, the liquid when it first approaches the screen will not yet have acquired much circumferential velocity, but when it gets into the screen and while it remains on the interior of the screen within the narrow spacing of baffles 55 from the screen 27, some of the liquid will acquire enough circumferential velocity to recycle outward, serving to clear the interstices; and some of the liquid will encounter the outer edges of baffles 55 and will be deflected inward. Thence it flows along the axis to the outlet 30.

Instead of the turbine blades 55, in FIGURE 12, we have used successfully, and at less cost, fixed radial baffles 54, e.g., as shown in FIGURES 10, 11, 19 and 21, inside the screen extending to the center or to a central space along which the liquid flows to the outlet 30. Whether turbine blades or baffles 55, or fixed baffles 54 are used, if they are brought close to the inside of the screen, the speed of the screen may be raised to that which gives the greatest separation, without frustration by centrifugal effects.

The action described can be attained by a difference in velocity between the liquid and the baffles whether the baffles are travelling faster than the liquid or slower, or are fixed. From a structural point of view it is simplest to have the blades secured in the rotor, as illustrated by FIGURE 12; but from an operational point of view, it is better to have the blades stationary as in FIGURE 11, so that, as the liquid acquires circumferential motion, the differential velocity will cause it to be engaged by the blades and not only diverted towards the axis, but at the same time loose circumferential velocity. This is illustrated by FIGURES 10, 11, 19 and 20.

The baffles 54 have been found to produce important advantages in that they block rotation of the filtrate as a body. Experiments with various structures which impede such rotation of the filtrate have shown that any impediment improves the efficiency, but for best results we have provided radial baffle plates 54 spaced a short distance from the inside face of the screen 27 and extending to or near the axis (e.g., to post 48g and cone 66g in FIGS. 11 and 19–21).

The space between the screen and the outer edges of these baffles provides room for the local flow back through the screen discussed above, but before the filtrate can acquire centrifugal velocity as a body, it is engaged by the baffles and deflected toward the axis and the outlet.

In a study made to compare various forms of baffles for this purpose we used a structure similar to that shown in FIGURES 10 and 11 and used the normal 50 mesh screening for the rotary drum. The post 48g is anchored on the bottom of outlet pipe 30 and extends up inside of the rotary screen drum 14g to a bearing 70 in the bottom of the shaft 16g; and this shaft, in turn, is held by the seal-bearing 18g secured to the top plate 20g′.

Figure 21:
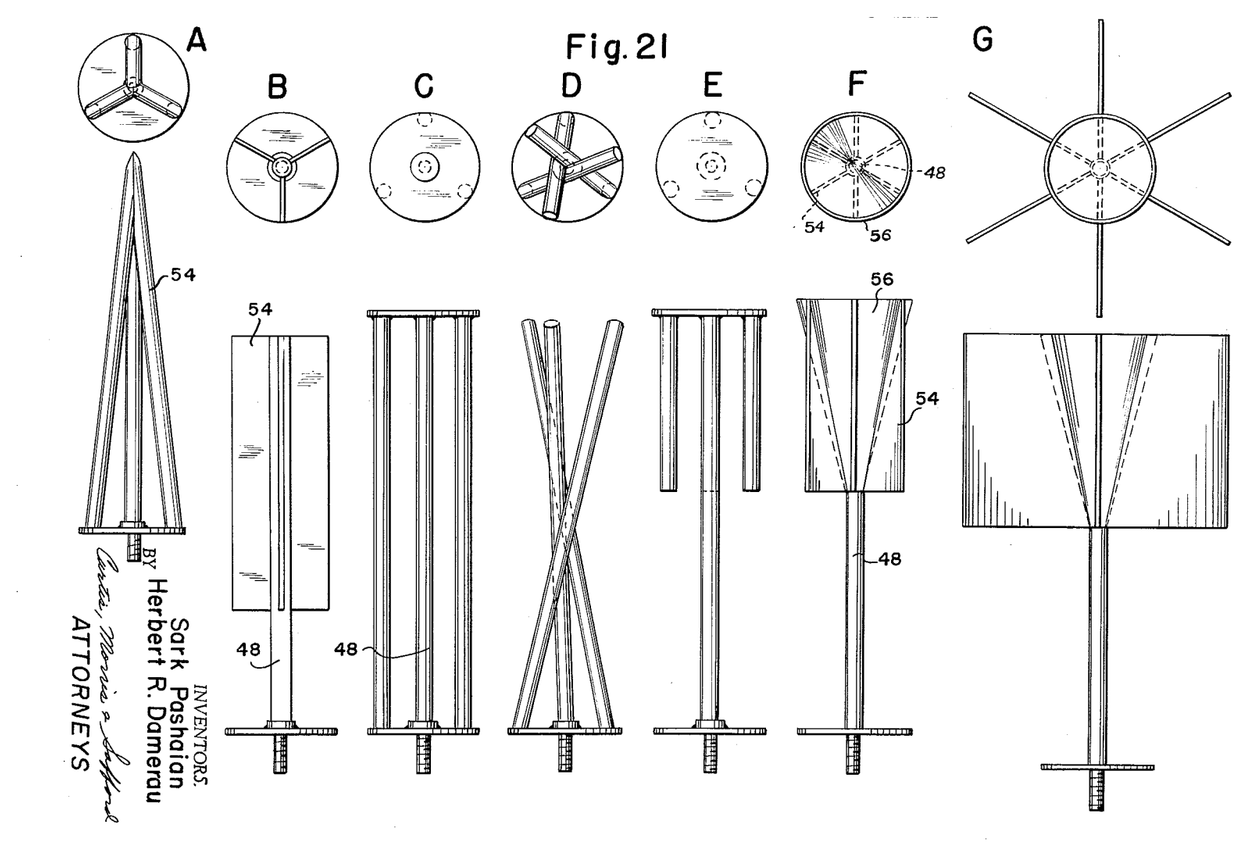
FIGURE 21 is a diagrammatic comparison of a number of flow control devices.

At first the intention was only to break up laminar flow, to facilitate distribution and flow of the filtrate toward the outlet. To this end a disc 2¾″ in diameter was mounted on the shaft corresponding to 48g close to the bottom of the outlet duct. The baffles 54 were mounted on this disc. For example, the bottoms of three ½″ rods 9¼″ long were secured to this disc at its periphery 120° apart and the top ends were brought together and secured, as shown in FIGURE 21, A. This assembly was used with a screen drum (14) 12″ in diameter and 6″ high with its top plate impervious and a center outlet hole 3⅜″ in diameter in its bottom plate. Outlet duct (30g) was 3⅜″ high, and bottom plate (26g) of the screen drum was 6¼″ above the bottom of the outlet duct, so that 3″ of the tilted rods project above the outlet into the center of the rotating drum.

This and other arrangements were tested as follows:

*Table A*

TEST FLOW RESULTS WITH 12″ DIAMETER ROTARY FILTER WITH DIFFERENT STATIONARY VANE ARRANGEMENTS

| Identity of Baffle | Fig. 21 | R.p.m. | Suction, Inches of Hg | G.p.m. |
|---|---|---|---|---|
| #1. None | | 300 | 15 | 95 |
| #2. Tripod half altitude of drum 120° on 3″ circle | | 300 | 15 | 108 |
| #3. Tripod full altitude of drum 120° on 3″ circle | A | 300 | 15 | 100 |
| #4. Radical baffles 120° apart, ½ in. outlet throat, ½ in. drum | B | 300 | 15 | 150 |
| #5. Full length rods parallel to axis 120° apart on 3″ circle | C | 300 | 15 | 145-150 |
| #6. Full length rods crossed at center to make double tripod 120° on 3″ circle | D | 300 | 15 | 130 |
| 7. Three half altitude plates 120° on 3″ circle | | 300 | 15 | 193 |
| #8. Six rods on 2½″ circle 60° apart | | 300 | 15 | 140 |
| #9. Six half altitude plates 60° on 3″ circle | | 300 | 15 | 200 |
| #10. Three short rods, 4½″ long depending from full length shaft w./cross arms to locate depending rods on 2½″ circle | E | 300 | 15 | 150 |
| #11. Like #10, except 6¼″ rods | E | 300 | 15 | 156 |
| #12. Triangular radial plates 60° apart, points down | | 300 | 15 | 214 |
| #13. Inverted cone (base up) at top of shaft w./six triangular radial vanes (base down) | F | 300 | (¹) | 236 |

¹ 13¾″-maximum obtainable with pump used.

As another comparison: whereas, with filter drum having open interior and exterior, i.e., without baffles or blades, except for the screen mesh, centrifugal force at 280 r.p.m. overbalanced a pump suction on the outlet equal to 10 inches of mercury, so that no filtrate was delivered; when six stationary baffles were positioned inside the rotating screen extending from the center to 1⅛″ from the screen and for the full length of the rotating drum, substantially the full capacity of pump (236 gallons per minute) could be maintained at 300 r.p.m. with suction of 13¾″ of mercury; and with 13 such baffles 260 g.p.m. were maintained at 300 r.p.m. and 400 r.p.m. with suction only 5″ and at 500 r.p.m. with suction 5½″. With this latter screen drum and clear liquid, 3½″ suction was required to maintain 270 g.p.m. flow with no rotation.

From this it became clear that the arrangement with the inverted cone and radial baffle plates (as shown in FIG. 21 at F) had substantial advantage, although any obstruction to circumferential rotation improves the efficiency. An interesting fact developed by these tests is that the addition of the inverted cone at the top of the shaft, by approaching a smoother transition flow path from radial entrance through the screen to axial outflow along the axis, gives a substantial further increase in efficiency. The final improvement came from extending the baffle plates radially close to the screen so that each baffle is quadrilateral with one oblique side fitting the side of the cone and the other sides rectangular and narrowly spaced from the sides and periphery of the drum 14. (FIG. 21, G, and FIG. 11).

This radial extension of the baffles had the effect of reducing the applied suction required for full performance. For example:

*Table B*

PERFORMANCE RESULTS WITH EXTENSION OF RADIAL VANES ON STATIONARY CONICAL BAFFLE

| R.p.m. | Vacuum, inches mercury | G.p.m. | Type of Baffles |
|---|---|---|---|
| 300 | 15 | 95 | None |
| 300 | 5 | 260 | Thirteen, extended. |
| 400 | 5 | 260 | Do. |
| 500 | 5½ | 260 | Do. |
| No | 5½ | 270 | Do. |

A startling finding here is that a vacuum of 3½″ is required for 270 gal. per minute with no rotation, while 260 gal. per minute flow at a significant rotation rate required only 5″ of vacuum. This indicates that there is only about 1½″ mercury suction pressure difference involved in the rotation phenomena. Thus, the speed of rotation and also of the suction pressure are made nearly independent of the flow by use of the stationary internal liquid flow distributors. In other words, for dislodgment of particles from the peripheral exterior surface of a fine screen, the r.p.m. may go up without suffering demand for increase of suction pressure or diminishing flow, as would be experienced in the absence of adequate interior stationary baffles.

It was also found that the vanes are subjected to relatively high torque effects so that it is important to use a rigid and rugged construction.

It is in the scope of the invention to vary the number of these vanes and the distance radially from the axis of the rotating drum and from the screen, and from the top and bottom end discs of the drum, and to use two, or three, or more different sizes of vanes, extending out from the main cone, or other center of the flow controller.

It is also in the scope of the invention to use vanes that are not on the true radii, extending out from the central shaft. Such curved vanes may be extended forward and help to catch the liquid and guide it inwardly and downwardly. The curvature may be on vanes that start out along the radius from the shaft 48 or the vanes may start curving near the extreme outer periphery, or they may start at some intermediate position in their surface and change the degree of curvature, particularly in the forward direction. The edges of these curved blades tend to cleave the liquid out of the peripheral portion within the rotating drum and get it moving to a central flow exit. It is in the scope of the invention to use such different curvatures on blades that are nonuniform in size or shape extending outward from a shaft or cone. Such blades are shown for example in FIGURE 13.

When these principles were applied to a 24″ diameter rotating drum filter of 12″ altitude, with 15″ suction pressure, the flow capacity at 120 r.p.m. was raised from 780 g.p.m. to 1000 g.p.m. by extending the baffles 2″ radially.

The reduction of suction pressure is an outstanding achievement of our invention. With a filter as shown in FIGURE 11, 300 g.p.m. of water was filtered at a pressure differential of about .25 p.s.i. .5 p.s.i. gave 500 g.p.m., 1.25 gave 1000 g.p.m. and 2⅛–2½ p.s.i. gave 1500 g.p.m. This of course reduces the power demand on the pump.

As shown in Table B, an outstanding accomplishment with these internal baffles was that the rotation could be changed through reasonably wide range without seriously affecting the rate of flow or static pressure differential across the filter. Thus indicating that the centrifugal force of the liquid body is no longer the important factor, i.e., that its substantial elimination actually results in substantial improvements.

One further improvement, which is incorporated in FIGURE 11, is the extension of the central outlet opening up into the area of the baffles, this is shown by the triangular cut-outs 74 in FIGURE 11. Thus the filtrate which flows axially to the outlet 30g can begin to flow around shaft 48g in the areas 74 in the direction of the outlet pipe before it reaches the edge of the pipe.

FIGURE 20 is a diagrammatic showing illustrating the application of the embodiment of FIGURE 11 to a power-washer or grit blasting apparatus. As shown here, the suction pump, indicated diagrammatically at 35, is driven by electric motor 75 through speed reducer 76. Motor 22, through gear reducer 24, drives the rotary screen 14, which is immersed in the contaminated liquid in the tank 10. As the operation of the pump 35 produces suction through the conduit 30 to the filter drum 14, the result of the pressure drop at the surface of the filter screen tends to drive through the screen, the liquid from the outside in the tank 10 into the drum and thence through the conduit 30 and pump 35 and eventually to the conduit 80, which supplies clean liquid under pressure for use in the power washer. After use, the liquid, together with soil which it has accumulated from the parts washing, or other treatment, returns to the tank 10; and, consequently, the contaminated liquid must be again clarified by the filter before being reused.

The filter 14 and the attached portion of the conduit 30 and flange 60 can be inserted and removed through a hole 61 in the cover 59 of tank 10. Thus, these parts can be removed and replaced without difficulty and when bolted down by bolts exterior to tank 10 and its cover 59, the resilient gasket on mouth 60 is compressed so that the conduit is sealed against loss of suction and entry of contaminated liquid.

As shown in FIGURE 11, the entire unit may be hinged so as to swing up the filter unit where it can be inspected and serviced above the tank.

While the unit is removed, pump 35 is stopped and conduit 30 or 80 is closed by a valve so that there is no substantial tendency for the contaminated liquid to run into the clear liquid lines. In order to avoid even the small amount of contamination that might work its way in by diffusion or displacement, it is possible to provide a slide valve as indicated at 81 in FIGURE 11.

The solids which settle as a sludge at the bottom of the tank 10 may be continuously removed e.g. by scrapers or on an endless chain dragged along the bottom and up a sloping end or ramp, e.g., as shown in the prior Patent No. 3,011,769.

Figure 16:
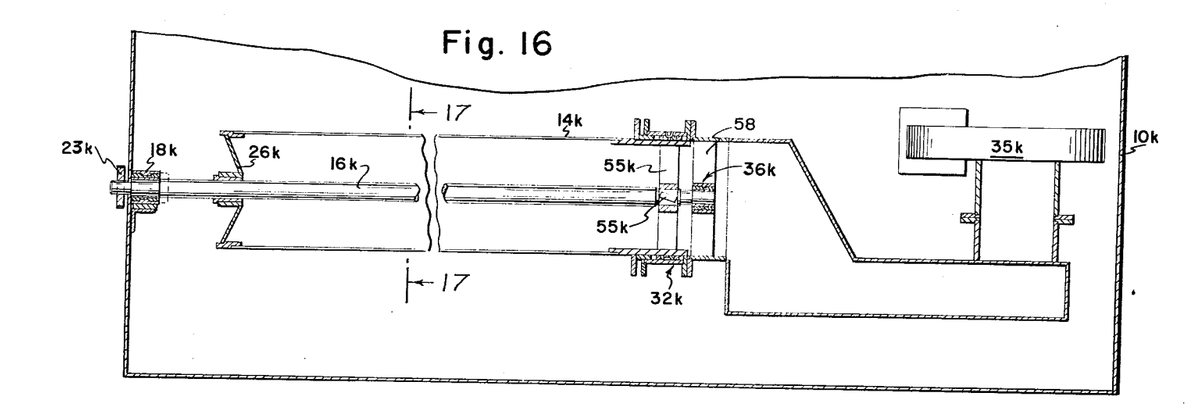
FIGURE 16 is a vertical axial section, with the center broken away, of an horizontal screen device.

FIGURE 16 illustrates that the rotating screen may be in a horizontal position. Shaft 16k allows the cylinder to be mounted and secured at one of its ends, as at 26k, to drive the cylinder for rotation. This shaft extends longitudinally through the filter cylinder with the spider mount 58 at its extreme right, and is mounted at one end in bearing 18k and at the other in bearing 36k on spider 58. A drive connection 23k is shown at the extreme left on shaft 16k. At the extreme right as viewed in FIGURE 16, is the outlet to the pump 35k and a seal 32k for conducting the liquid to a pump.

A combination seal and bearing may secure and support the right end of the cylinder instead of extending a shaft on through to a bearing 36k. In that case a bearing would be eliminated and the shaft cut short after entering the extreme left section of the filter screen cylinder.

This entire assembly of bearings, cylinder and outlet to the pump is submerged in a tank 10k advantageously at such a depth that very little or no turbulence occurs at the top. Or it may be located near the top level of the liquid so as to draw in more surface liquid, but advantageously without sucking air through the cylinder. The nature of the liquid, the size of selected screen mesh, the suction developed by the pump and the rotating speed govern the most advantageous depths of submersion of the filter cylinder.

It is in the scope of the invention with this horizontal type, as pointed out also in the foregoing discussion of the vertical shaft type, to vary the diameter of the cylinder, the length of the cylinder, the selection of the mesh screen, the installation, arrangement and extent of internal vanes or rods parallel or at an angle with the main axis.

In the example shown in FIGURE 16, rotating vanes 55k are shown at the extreme right of and within the filter drum 14k. These vanes may be various in number, shape, and pitch, to give the desired velocity of liquid displacement, thus acting as a pump within the filter drum assembly to augment displacement of liquid therefrom.

Figure 17:
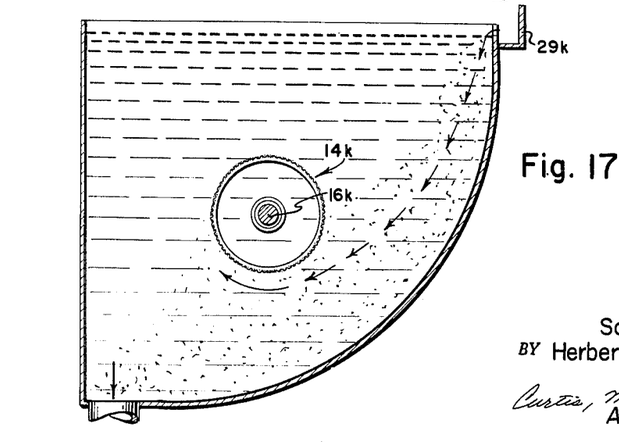
FIGURE 17 is a cross-section on line 17—17 of FIGURE 16.

As shown in FIGURE 17, the raw liquid is fed into the tank from the inflow gutter 29k along one side parallel to the screen axis, and advantageously above the sludge outlet. It is fed by overflow from the trough or weir 29k so that turbulence in the raw liquid is minimized and sedimentation begins as soon as it enters the tank 10k. The rotation of the screen is toward this inlet on top and downward on its side adjacent to the inlet. Thus, as the liquid flows inward from the inlet toward the screen, it is bombarded by solid particles thrown off by the screen outward toward the inlet, and downward, so that the particles carried by the incoming liquid are driven back toward the wall of the tank and downward toward the sludge outlet. Beneath the filter screen the tangential throw off is directed away from the sludge outlet; but gravity is added to their own inertia to carry the particles down out of reach of the suction in the screen and then along the sloping side and bottom to the sludge outlet. Only above the screen will the solid particles tend to return to the screen, but by the time the liquid reaches that quadrant most of the readily settlable solids will have escaped to the wall. Such solids as do come to the screen are struck by the particles thrown off by the screen or by the rapidly moving protuberances or by the side edges of the wires etc., by some other phenomenon not known, to impact or repel other approaching solids.

It will be seen by those skilled in the art that this is a significant and inobvious improvement in many respects among which we may particularly point out:

(1) Providing for continuous separation of solids adaptable over a wide range of particle sizes. Among solids which can be thus separated are metal cuttings, sand and other foundry materials, fibers, and fibrous scraps, to illustrate the widely differing types of solids which can be separated.

(2) Ability to handle large volumes and high rates of flow in compact equipment without clogging.

(3) Wide adaptability to different types of liquids and of carried solids, by changes of screen types and apertures, changes of r.p.m., use of vanes, etc.

(4) Adaptability to vertical, horizontal or angular orientation of submerged rotating screens so that it can be readily adapted to fit into space available with companion apparatus with which it is to be used.

(5) Maintained efficiency of flow even with high soil loading and also with high dilution.

(6) Low power requirements and economy in operation.

(7) Minimized maintenance costs. Avoids shut-downs for cleaning clogged screens, no filter paper or other filter media to replace.

(8) Savings by continual clarification and reuse of solutions, avoiding necessity of buying additional chemicals for replacement solutions and reducing requirements for pure water.

(9) Increased flow by use of bars, vanes, etc. in or on the rotating screen and/or by use of external pumps.

(10) Integration of filter with companion equipment such as a power washer for example, by delivering output directly to the pump of such apparatus and using such pump to maintain suction at filter face, and protecting pump by feeding it filtered liquid.

(11) Use of filtered fluid in seals under pressure sufficient to exclude soils which would clog or abrade.

(12) Reduction of abrasion and clogging of screen by bombardment with particles thrown off from the screen.

(13) Ability to clean screens after period of reduced flow, or shut-off, by reversal of screen operation.

(14) Immunity to foam difficulties and freedom from foaming in operation.

(15) Assures constant full flow, avoids "starving" of pumps, jets and other apparatus.

(16) Freedom from need for large storage facilities.

(17) Aid to sedimentation—making maximum use of gravity.

(18) Concentration of sludge at removal area.

Although we have shown the tank 10 for unfiltered fluid as a simple open top receptacle, it is not necessarily so, and with some fluids to be filtered it must be enclosed. If enclosed, it also permits the feed fluid to be supplied to and held therein under pressure sufficient to provide the required pressure differential across the filter barrier, in which case the suction pump 35 may be omitted.

The rectangular tanks 10 of FIGURES 1, 11 and 20 (ordinarily relatively long and narrow so as to fit along one side of a power washer or other apparatus for which the liquid is clarified) and obstructions, such as the pillars 62g in FIG 11 and the abrupt vertical wall shown in FIG. 17, all serve to hold the exterior body of liquid from free rotation about the axis of the screen; and the high rate of exit flow helps to prevent the liquid from merely whirling around the drum.

Although we have given herein explanations and theories of the operation of the invention which we believe will be helpful to others in applying our invention to practical conditions of use, the invention is not dependent upon the correctness or fallacy of these, and it is recognized that further study and experiment may prove other theories to be correct. Our patent therefore is not to be limited by or dependent upon them.

We claim:

1. Rotary filter device which comprises a tank for containing a mass of liquid having suspended particles to be filtered therefrom, a chamber having a pervious wall with spaced parts defining therebetween a multiplicity of openings, bearings rotatably mounting said chamber in the tank with the pervious wall portion of said chamber being submerged in said liquid, means for flowing the filtrate of said liquid through said pervious wall and out of said device at a rate to minimize rotation of the mass of liquid as a whole, means for rotating said chamber at a speed which causes said spaced parts to sweep through the filtrate passing into said chamber with a frequency to encounter substantially all of the particles carried therein and with a directed energy to cause such particles to be driven back away from said pervious wall, thereby separating the filtrate from said particles, said openings between said spaced parts being large enough to permit said filtrate to pass readily therethrough and further being small enough to allow said spaced parts to sweep the filtrate with a frequency sufficient to repel substantially all the particles carried thereby, a sludge outlet from said tank below said pervious wall, a liquid suspension inlet, a filtrate outlet from the interior of said chamber and stationary baffles fixed within said chamber closely spaced from said pervious wall adapted to deflect the filtrate to discharge directly out of said chamber immediately upon passing through the wall by blocking rotation of said filtrate about the axis of said chamber.

2. A method of separating suspended particles from a suspension thereof in liquid, which comprises causing said particle laden liquid to flow across a wall having a submerged pervious portion formed of spaced parts which define a multiplicity of openings therebetween, rotating said wall across said flow with a frequency and speed relative to the particles flowed thereto such that the spaced parts of said wall encounter substantially all of said particles and dynamically act upon such particles and the liquid immediately adjacent thereto to drive such particles back away from said wall, maintaining substantially the body of liquid as a whole substantially quiescent by flowing the suspension to the wall of the drum at such a rate to substantially counteract the tendency of the rotating drum to rotate said body, minimizing the rotation of liquid in the vicinity of said wall to ensure that the speed of the spaced parts is sufficiently greater relative to the speed of the particles flowed thereto to repel the latter.

3. A method as described in claim 2 further comprising obstructing the rotation of said filtered liquid within said wall, and settling and removing the repelled particles.

4. Rotary filter device for separating a liquid filtrate from a mass of liquid having particles suspended therein, a chamber having a pervious wall with spaced parts defining therebetween a multiplicity of openings, the pervious wall portion of said chamber being adapted to function submerged in said liquid, means for flowing the filtrate of said liquid through said pervious wall and out of said device at a rate to minimize rotation of the mass of liquid as a whole, means for rotating said chamber at a speed which causes said spaced parts to sweep through the filtrate passing into said chamber with a frequency to encounter substantially all of the particles carried therein and with a directed energy to cause such particles to be driven back away from said pervious wall, thereby separating the filtrate from said particles, said openings between said spaced parts being large enough to permit said filtrate to pass readily therethrough and further being small enough to allow said spaced parts to sweep the filtrate with a frequency sufficient to repel substantially all the particles carried thereby, and stationary baffles fixed within said chamber closely spaced from said pervious wall adapted to deflect the filtrate to discharge directly out of said chamber immediately upon passing through the wall by blocking rotation of said filtrate about the axis of said chamber.

References Cited by the Examiner

UNITED STATES PATENTS

| | | | |
|---|---|---|---|
| 839,514 | 12/1906 | Rood | 210—354 X |
| 1,025,059 | 4/1912 | Hatton et al. | 210—78 X |
| 1,230,099 | 6/1917 | Bingham | 210—416 |
| 1,262,146 | 4/1918 | Ward | 210—381 |
| 1,664,769 | 4/1928 | Chance | 210—78 |
| 1,794,916 | 3/1931 | Naugle | 210—416 X |
| 2,197,971 | 4/1940 | Elze et al. | 210—444 X |
| 2,442,234 | 5/1948 | Dunmire | 210—78 X |
| 3,018,986 | 1/1962 | Gewiss | 210—493 X |

REUBEN FRIEDMAN, *Primary Examiner.*

HERBERT L. MARTIN, *Examiner.*